United States Patent [19]
Fleckenstein et al.

[11] Patent Number: 6,047,566
[45] Date of Patent: Apr. 11, 2000

[54] METHOD AND DEVICE FOR MELTING RECYCLED SILICATE STARTING MATERIALS

[75] Inventors: Hermann Fleckenstein, Ludwigshafen; Markus Siegler, Hartshausen, both of Germany

[73] Assignee: Isover Saint-Gobain, Courbevoie, France

[21] Appl. No.: 08/930,333

[22] PCT Filed: Mar. 22, 1996

[86] PCT No.: PCT/EP96/01267

§ 371 Date: Jan. 12, 1998

§ 102(e) Date: Jan. 12, 1998

[87] PCT Pub. No.: WO96/30312

PCT Pub. Date: Oct. 3, 1990

[30] Foreign Application Priority Data

Mar. 24, 1995 [DE] Germany ............ 195 10 874

[51] Int. Cl.$^7$ .............. C03B 5/18; C03B 19/08; C03B 5/14; C03B 3/00
[52] U.S. Cl. ............ 65/134.8; 65/19; 65/134.7; 65/335; 65/347
[58] Field of Search ............... 65/19, 28, 134.1, 65/134.7, 134.8, 135.9, 335, 347; 588/252, 900; 432/13, 14, 120, 156, 163, 200

[56] References Cited

U.S. PATENT DOCUMENTS

| | | |
|---|---|---|
| 2,306,462 | 12/1942 | Moorman . |
| 3,443,921 | 5/1969 | Boivent . |
| 3,555,164 | 1/1971 | Kostin et al. . |
| 3,563,722 | 2/1971 | Troyankin et al. . |
| 3,748,113 | 7/1973 | Ito . |
| 3,805,714 | 4/1974 | Sharpe . |
| 3,834,860 | 9/1974 | Fukuda et al. . |
| 4,101,263 | 7/1978 | Lumpkin, Jr. . |
| 4,135,904 | 1/1979 | Suzuki et al. . |
| 4,146,359 | 3/1979 | Lumpkin et al. . |
| 4,544,394 | 10/1985 | Hnat . |
| 4,553,997 | 11/1985 | Hnat . |
| 4,617,042 | 10/1986 | Stickler . |
| 4,631,080 | 12/1986 | Westra et al. . |
| 4,957,527 | 9/1990 | Hnat . |
| 5,447,547 | 9/1995 | Goldfarb et al. . |
| 5,672,190 | 9/1997 | Litka et al. . |
| 5,709,728 | 1/1998 | Fleckenstein et al. . |
| 5,817,909 | 10/1998 | Lescuyer et al. . |

FOREIGN PATENT DOCUMENTS

| | | |
|---|---|---|
| 950931 | 11/1949 | France . |
| 1771299 | 1/1971 | Germany . |
| 3335859 C2 | 11/1989 | Germany . |
| 43 25 726 | 2/1995 | Germany . |

*Primary Examiner*—Stanley S. Silverman
*Assistant Examiner*—Jacqueline A. Ruller
*Attorney, Agent, or Firm*—Pillsbury Madison & Sutro LLP

[57] ABSTRACT

The present invention concerns a method for melting recycled silicate starting materials. A rotating transport flow with helical flow filaments of transport air and starting material is supplied in the direction of the helix axis into the combustion chamber of a cyclone furnace. Preferably, preheated fresh air is used which is supplied partly into the combustion chamber as combustion air therefor and partly in the form of the transport air. Furthermore, the present invention concerns a device for melting recycled silicate starting materials. The device includes a combustion chamber where fuel and combustion air can be burnt up in the presence of the starting material. A forechamber is arranged between an admixer for generating an injector flow and the combustion chamber. The injector flow can be supplied into the forechamber through a charging conduit to generate a transport flow made up of starting material and transport air. The forechamber includes an outlet port opening into the combustion chamber.

30 Claims, 3 Drawing Sheets

METHOD AND DEVICE FOR MELTING RECYCLED SILICATE STARTING MATERIALS

This application is the national phase of international application PCT/EP96/01267 filed Mar. 22, 1996 which designates the U.S.

The present invention concerns a method for melting recycled silicate starting materials wherein heat for melting the silicate substances is generated while supplying fuel and combustion air, and furthermore concerns a device for carrying out this method.

For the production of mineral wool products, melting silicate starting materials is a basic prerequisite. Herein there is a need for also using mineral wool waste as recycled starting materials.

Supplying recycled starting materials or silicate waste materials, respectively, into the combustion chamber presents problems particularly where pressure above atmospheric exists inside the combustion chamber. This is, for example, the case with a combustion chamber in the form of a cyclone as known from the generic document DE 43 25 726 A. If the starting material to be introduced is present e.g. in the form of fine particles or has a high surface/mass ratio, then the weight force of the starting material particles will not be sufficient to overcome the lift force resulting from the positive pressure, in the absence of which the starting material particles might be charged in the manner of a bulk material by pouring into the combustion chamber. If, now, the starting material were injected rectilinearly into the combustion chamber by means of an accelerated transport flow, although it would be possible to thereby improve penetrating ability of the starting material into the combustion chamber, this would considerably reduce the dwelling time of the starting material inside the combustion chamber owing to the high flow velocity, with the result that the starting material cannot be melted satisfactorily any more.

In the case where recycled silicate starting materials or silicate waste materials, respectively, are to be melted, organic impurities of the recycled starting material and waste products adhering to it, respectively, which e.g. result from binding agent or remainders of lamination, must concurrently be oxidised besides melting the starting material. This requires a long dwelling time of the recycled starting material inside the combustion chamber. Following their formation, the combustion products must moreover not be remixed with the obtained pure silicate molten material. During such a melting process performed in a suitable combustion chamber, more pressure builds up on top of the inherently present pressure above atmospheric mentioned above because the originally solid impurities are present in the form of gaseous combustion products following their combustion, bringing about an increase of their volume. This increases the difficulties of introducing the starting materials into the combustion chamber, i.e. particularly when the surface/mass ratio is relatively high.

Accordingly, it is the object of the present invention to impart sufficient penetrating ability into the combustion chamber to the recycled starting material or silicate waste materials, resp., in order to enable complete melting of the recycled starting material on the one hand, and—given the case achieve—complete combustion of the waste products and respective impurities adhering to the recycled starting material on the other hand in order to produce a molten silicate material that is sufficiently pure for producing new mineral wool products.

When a rotating transport flow comprising helical flow filaments of transport air and recycled starting material or silicate waste materials, respectively, into a combustion chamber in the direction of the helix axis, this results in the advantage of the starting material having a large amount of kinetic energy and thus good ability of penetrating into the combustion chamber while exhibiting only a relatively small velocity component in the direction of the helix axis. The starting material, owing to its movement along helical trajectories, thus experiences a considerably longer dwelling time inside the combustion chamber. A sufficiently long dwelling time is thereby ensured despite considerable kinetic energy upon charging. The starting material conveyed in the transport flow is thus subjected to a considerably longer-lasting heat influence enabling complete melting of the starting material. The longer-lasting heat influence furthermore enables complete oxidisation or combustion, respectively, of impurites adhering to the recycled starting material or waste substances mixed therewith, such as e.g. organic substances or binding agent. As a result of the prevailing centrifugal forces brought about by the helical movement of the transport flow, proper separation of the molten starting materials on the one hand and the combustion products on the other hand is moreover ensured because of their different densities and/or states of aggregation. If the heat influence is furthermore sufficiently high, all of the combustion products inside the combustion chamber are present in the gaseous phase and may be mixed with the exhaust gas of the flame if the heat source is a burner flame. Re-mixing of combustion products and molten starting materials may thereby be precluded.

In melting recycled starting material or silicate waste materials, respectively, originating from mineral wool, the latter is advantageously used in the form of fragments of mineral wool products which are obtained by a mechanical comminution device prior to their introduction into the combustion chamber such that subsequently, recycled starting material particles having average sizes of less than 10 mm are present. It was, however, surprisingly found that even irregularly shaped mineral wool fragments having diameters in excess of 10 mm are satisfactorily carried along by the transport flow without prior comminution measures.

The method according to the invention is also suited for melting mixtures of vitreous compositions in general, with several processing units arranged in parallel providing a solution to the problem of the output quantity. Here, too, corresponding recycled starting material might additionally be used.

If the transport flow is supplied into the upper zone of the combustion chamber coaxially with the longitudinal axis of the combustion chamber, such coaxial introduction enables approximately centrically symmetric formation of flow and/or of combustion conditions inside the combustion chamber, thus favoring a simplified process management.

The rotating transport flow may, for example, be generated by accelerating the transport air supplied in a conduit by using an impeller or a turbine-type compressor. The impeller or compressor wheel, respectively, concurrently imparts the desired rotation to the accelerated transport air. The starting material may then be supplied to the accelerated and rotated transport air.

For the purpose of generating the transport flow, transport air is accelerated e.g. by means of an injector, and starting material is introduced into the accelerate. transport air. Herein combustion air may also be used as the transport air if surplus combustion air constitutes an advantage in terms of improved combustion of the waste products. The recycled starting material or silicate waste materials, respectively, which is e.g. ground or otherwise disintegrated, may be admixed to this accelerated transport air or additional combustion air, respectively, in the form of starting material particles. Introduction of the starting material into the transport air offers an additional advantage, namely the possibility of setting an optimum mixing ratio of transport air and starting material with a view to combustion as early as during their mixing. As the flow of accelerated transport air including the supplied starting material is initially guided as a linear injector flow, in-situ monitoring of the mixing ratio, e.g. by means of optical sensors, is substantially facilitated.

Once the accelerated transport air comprising the admixed starting material, initially guided as a linear injector flow, is subsequently made to rotate, the desired rotating transport flow including helical flow filaments of transport air and starting material is obtained. This rotating transport flow offers the invaluable advantage of the starting material particles contained in the rotating transport flow largely following the helical flow filaments on constant helical trajectories. Hereby it is ensured that a mixing ratio of transport air and starting material, once it has been set, will not be modified essentially because segregation resulting from undesired spots of stagnation in flow spaces and re-mixing resulting from uncontrolled turbulences are avoided.

To this date it does, however, remain unclear what rules of flow underlie the observed transformation of the linear injector flow into the rotating transport flow including helical flow filaments of transport air and starting material inside the forechamber. In any case, it appears that the transport flow, having been generated in the forechamber, flows inside an imaginary corkscrew-shaped tube in the manner of following a spiralling staircase without any divergence worth mentioning at the beginning.

In the case where the transport flow supplied inside the combustion chamber is, encompassed in the upper zone of the combustion chamber by a rotating envelope flow including helical flow filaments, this has the advantage that contact between the transport flow and the combustion chamber wall in the upper zone of the combustion chamber may be avoided at the outset, and that the transport flow, owing to the centrifugal forces prevailing crosswise with respect to the helix axis, can gradually diverge to increasingly permeate the envelope flow along the helix axis in the direction of movement. If, for example, the envelope flow has the form of a burner flame intended for thermal input, then optimum thermal input into the transport flow has become possible in this manner. It has the result that the starting material particles can be melted completely and waste products can be entirely oxidised or burnt up, respectively.

If the transport flow and the envelope flow, or the burner flame, respectively, mix with each other while descending, a continuously intensifying mixing of the envelope flow with the transport flow in the direction of the longitudinal axis of the combustion chamber may be obtained in this manner. This ultimately results in the obtained melt depositing in the bottom zone of the combustion chamber at the outside of the combustion chamber wall and flowing along the latter, and the exhaust gas together with the combustion products present therein flowing in the center along the longitudinal axis of the combustion chamber.

In addition, a temperature gradient may be set lengthwise across the combustion chamber e.g. if the envelope flow is in the form of a flame. This makes it possible to create consecutive zones having different mean temperatures in the longitudinal direction. Owing to the negative temperature gradient, the temperature inside the combustion chamber continuously decreases in the direction of flow, whereby the respective most favorable temperature range for each subprocess may be traversed on the passage through the combustion chamber. Thus, e.g. in order to oxidise binding agent or remainders of lamination, a higher temperature is required than for melting the starting material, and the starting material, once it has been melted, may in turn be kept liquid and the exhaust gas may be kept gaseous at lower temperatures. In this manner, optimum energy exploitation of the heat energy input is furthermore ensured.

The transport flow and the envelope flow may rotate in a same direction, i.e. their rotational vectors may in such a case have the same orientation. In this manner, a very tranquil and turbulence-free mixing of the envelope flow with the transport flow may be attained. If the envelope flow has the form of a flame, smooth combustion of the waste products and melting of the starting material can additionally be achieved. The temperature gradient may be assumed to be relatively shallow because the transport flow and the envelope flow mix only slowly. This process management is of interest in desired smooth melting of the silicate starting material.

In the case of another advantageous process management, the transport flow may rotate in a direction opposite to the direction of rotation of the envelope flow inside the combustion chamber, i.e. their respective rotational vectors are opposed. Intense mixing of the transport flow with the envelope flow may thus be achieved as early as in the zone where the two flows first encounter each other. Particularly where the envelope flow has the form of a flame, violent turbulences may result in the boundary area of transport flow and envelope flow, thereby additionally enabling a rapid combustion of the waste products and thus combustion of the waste products which is restricted to a relatively small area inside the combustion chamber. The temperature gradient in the longitudinal direction of the combustion chamber may be assumed to become relatively steep in this case. This process management can be of interest for heavily impurity-laden recycled starting materials or silicate waste materials, respectively, comprising a very large content of waste substances to be oxidised.

The oxidised or burnt waste products or waste substances such as e.g. binding agent or remainders of lamination contained in the starting material to be reutilised, enter into the gaseous phase at a correspondingly selected first dwelling time and a correspondingly selected elevated combustion temperature in the upper zone of the combustion chamber and may be mixed with the burner exhaust gas, i.e. with the combustion products of the flame, to be reconfigured into a composite exhaust gas. Hereby it is ensured that the waste substances, following their combustion, cannot re-mix with the molten starting material. By suitably choosing a second dwelling time and a lower temperature in a central zone of the combustion chamber, optimum conditions for melting the starting material can be set. In this case, the starting material, once it has been melted, remains in the liquid phase. It is furthermore possible to convey the exhaust gas as well as the obtained molten material from the combustion chamber through a common outlet. The exhaust gas then flows in the center along the longitudinal axis of the combustion chamber through the outlet out of the combustion chamber, and the molten material flows in the bottom zone of the combustion chamber along the combustion chamber wall toward the outlet, and along its edge out of the combustion chamber.

Jointly channelling the exhaust gas and the molten material is favorable to keeping the structure of the facilities simple. Separate conduits or channelling means for the molten material and the exhaust gas are not necessary as these already are separate when they exit through the common outlet. It is furthermore possible to combine the exhaust gas produced during melting of the recycled starting materials or silicate waste materials, respectively, with the exhaust gas of a molten material produced during melting of fresh starting material in a melting tub and to jointly supply these two exhaust gases, namely the exhaust gas originating from the recycled material on the one hand and the exhaust gas from the molten fresh starting material on the other hand, to a common exhaust gas treatment and exhaust gas purification. In this context, DE 43 25 726 A is herewith fully incorporated by way of reference.

Fresh air or combustion air, respectively, is supplied with heat energy from a tub exhaust gas and/or from the exhaust gas of the combustion chamber, and the fresh air thus heated is then in part supplied directly into the combustion chamber as combustion air and in part supplied as transport air. In a particularly preferred process management, the fresh air or combustion air, respectively, is present at an ambient temperature of approximately 20° C. and is supplied to a heat exchanger or a recuperator, as described e.g. in DE 43 25 726 A. This heat exchanger transfers the heat energy from the exhaust gases, which flow into the heat exchanger at approximately 1000° C. and leave it at approximately 200° C., to the combustion air which is thereby heated to approximately 650° C. This results in a substantially improved thermal balance of the method on the one hand and the heated transport air can on the other hand advantageously absorb humidity which is possibly contained in the recycled starting material. The starting material is thus dried after its admixture into the heated transport air, and undesirable formation of condensate inside the forechamber can thus be prevented.

It is thus for the first time proposed to interpose a forechamber between an admixer generating an injector flow and a combustion chamber having the function of melting the recycled starting material or silicate waste materials, respectively,. The injector flow may be supplied to the forechamber through a charging conduit for the purpose of producing a transport flow of starting material and transport air. This charging conduit enters eccentrically into the forechamber in a crosswise direction with respect to the central axis. The forechamber furthermore comprises an outlet port arranged crosswise with respect to the central axis and at an axial distance from the charging conduit, which opens into the combustion chamber. As a result, transport air can initially be accelerated by means of the admixer and charged with recycled starting material or silicate waste material preferably present in the form of starting material particles. The transport air thus accelerated and charged with starting material can subsequently be supplied in a crosswise direction with respect to the central axis of the forechamber and eccentrically with respect to the center of the forechamber, whereby the injector flow linearly directed up to this point is transformed into a rotating transport flow comprising helical flow filaments. As the outlet port of the forechamber in the direction of movement has a crosswise orientation with respect to the central axis of the forechamber as well as with respect to the helix axis ideally coinciding therewith, the resulting rotating transport flow comprising helical flow filaments of transport air and starting material may exit from the forechamber through the outlet port in a configuration resembling a corkscrew.

U.S. Pat. No. 4,544,393 discloses a method of melting glass in a vortex reactor and furthermore several embodiments of toroidal vortex reactors. In particular it deals with mixing up to three different partial mixtures of pulverised class forming materials for producing glass, and air or gas, respectively, as well as the introduction thereof into the respective embodiment of a toroidal vortex reactor. The stochiometry and heat release in the vortex reator are controlled by adjusting the oxidant/fuel ratio in the suspension preheater and the vortex reactor. The heated suspension particles are mixed and distributed to the walls of the vortex reactor by fluid mechanically induced centrifugal forces, with glass forming reactions occuring along the vortex reactor walls. The re-utilisation of silicate waste material to recycle it and the introduction thereof into an especially adapted device, however, is not disclosed in this document.

From U.S. Pat. No. 3,555,165 and from DE-PS 33 35 859, respectively, a device is known wherein a finely granular ore concentrate is horizontally injected at high velocity together with reaction gases by means of an injector into the upper zone of a cyclone-type combustion chamber. This device, however, cannot be utilised for introducing silicate waste materials into the combustion chamber. In the case of DE-PS 33 35 859 several, e.g. four injectors or nozzles disposed in a plane forming the extension of the sides of a square are used. The injecting directions are oriented secantially with respect to the combustion chamber circumference such that upon use of four nozzles instead of a single nozzle, when viewed sequentially while moving around the square, intersection of the respective following flow in the circling sequence is narrowly avoided. Each single one of the injectors blows the starting material directly onto the secantially opposite combustion chamber wall in the area of the following injection nozzle. This has the disadvantage of the combustion chamber wall being subjected to an additional, unnecessary mechanical strain and thus being subject to increased wear. A reduced useful life of the combustion chamber wall can, however, not be accepted in melting silicate starting materials or silicate waste materials, resp.

If, the admixer consists of an injector comprising an injection nozzle, a starting material supply conduit exemplarily consisting of a simple starting material chute, and an inlet port into the charging conduit to the forechamber, this allows for a very simple structure characterised on the one hand by its sturdiness and easy management of the flow conditions on the other hand. Particularly use of the injector comprising the injection nozzle enables very efficient acceleration of the transport air which is optimum in terms of flow mechanics. In this case the transport air may, for example, initially be pre-compressed and preaccelerated, respectively, by a commercially available compressor or blower and then relaxed and subsequently accelerated by means of the injector nozzle.

A burner for combustion of the fuel and of the combustion air is provided externally of the combustion chamber, the burner orifice of which enters eccentrically into the upper zone of the combustion chamber within a plane parallel with the longitudinal axis of the combustion chamber, such that a generated flame having the form of an envelope flow can be channelled eccentrically into the combustion chamber. Hereby various advantages are attained. On the one hand, the envelope flow or the burner flame, respectively, being in direct contact with the combustion chamber wall, ensures that the combustion chamber wall receives a thermal load if any, and contact between the transport flow and the combustion chamber wall is avoided, whereby undesirable adhering of starting material particles to the combustion chamber wall may be prevented. It is moreover ensured that the transport flow during its passage through the combustion chamber may diffuse into the envelope flow and thereby optimum thermal input is possible at any point of time. In a preferred embodiment, the burner and the combustion chamber form a melting cyclone furnace. This makes all the advantages of a melting cyclone available. In this context, DE 43 25 726 A is fully incorporated by way of reference.

If a portion of the forechamber disposed in the forechamber at an upstream position relative to the outlet port has a conically tapering configuration, the generated transport flow may on the one hand be constricted and further accelerated, and on the other hand heat reflection from the combustion chamber into the forechamber is largely prevented. This conical taper of the forechamber zone situated upstrom of the outlet port moreover prevents starting material particles—which might be slightly heated owing to a thermal feedback from the combustion chamber which cannot be excluded altogether—from adhering to the forechamber wall upon possible contact therewith owing to incompletely cured binding agent. In a preferred embodiment, the outlet port of the forechamber opens directly into the combustion chamber, resulting on the one hand in a compact structure of the combination of forechamber and combustion chamber and on the other hand in the advantage of the generated transport flow not being unnecessarily delayed.

The forechamber comprises a cooling means for cooling the forechamber wall. Hereby it is ensured that slightly heated starting material particles, possibly incompletely polymerised binding agent constituents of which might normally bring about adhesion upon contact with the forechamber wall, precisely do nicht adhere to the forechamber wall. Namely, upon contact with the forechamber wall, the starting material particles may cool down again and the residual binding agent not entirely cured may cure, whereby the starting material particles can again separate from the forechamber wall.

In an advantageous embodiment, the combustion chamber comprises a cooling means for cooling the combustion chamber wall. Moreover, by lining the combustion chamber wall with bricks of refractory material, extremely high temperatures can be provided inside the combustion chamber.

The combustion chamber comprises an outlet port for the starting material molten material and the exhaust gas, which is disposed crosswise with respect to the longitudinal axis, with the outlet port joining into a supply conduit or connecting channel, respectively, toward a melt bath or a melting tub, respectively. Thus the exhaust gas and the molten starting material may be removed together. In this manner, the molten starting material may be supplied to the freshly molten material of fresh starting material separately melted inside the melting tub and then processed into new mineral fibers together with it in the downstream sections of the installation. The exhaust gas formed during melting of fresh starting material can moreover be supplied to the exhaust gas formed in the melting tub and combined with it, such that already existing exhaust gas purification facilities may thus be utilised without any further structural modifications for exhaust gas purification of the exhaust gas originating from recycled material. In this context, reference is again made to DE 43 25 726 A.

The invention shall be explained below in more detail by making reference to the drawing, wherein.

Figure 1:
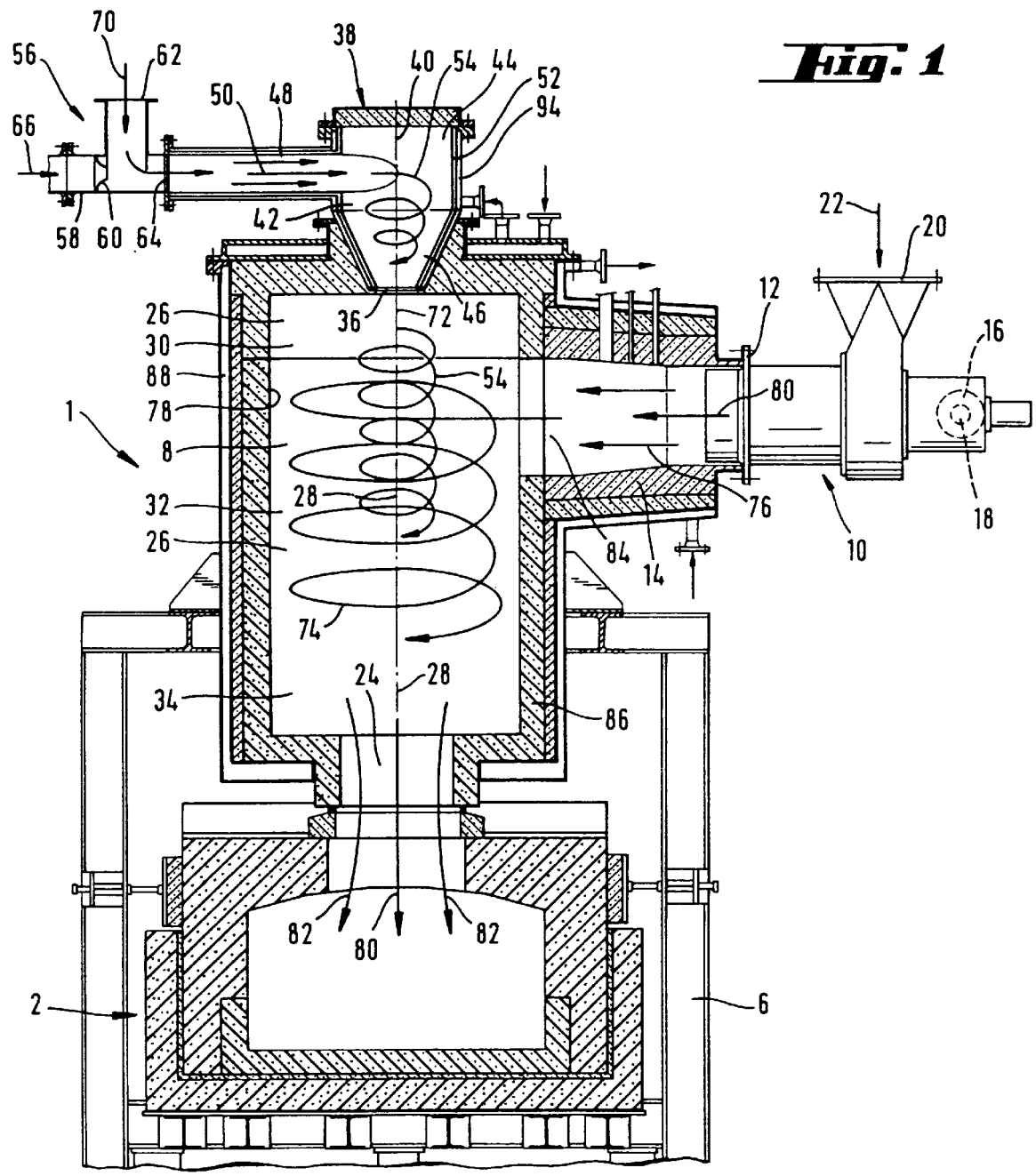
FIG. 1 shows a sectional view of the part of the installation consisting of forechamber, combustion chamber and feeder toward the melting tub, with the plane of section being parallel to the flow direction of the injector flow.

In FIG. 1, an embodiment of the device of the invention is represented. A melting cyclone furnace 1 is arranged on a feeder 2 which opens into a melting tub (not shown). This arrangement is supported by double T-profile steel girders 6.

The melting cyclone furnace 1 comprises a combustion chamber 8 including a burner 10 which, by means of a burner connection 12, is secured to a flame tube 14 in turn extending into the combustion chamber 8 at the melting cyclone furnace 1. The burner 10 comprises a fuel connection 16 through which it may be supplied with fuel 18. The burner 10 furthermore comprises a combustion air connection 20 through which it may be supplied with combustion air 22 for combustion of the fuel 18.

The combustion chamber 8 of the melting cyclone furnace 1 is connected to the melting tub (not shown) through an outlet port 24 via the feeder 2 and has semicircular cross-sections 26 arranged along the longitudinal axis 28 of the combustion chamber 8. The combustion chamber 8 may be mentally divided into at least three zones, namely the upper zone 30, the central zone 32 and the bottom zone 34. In the bottom zone 34 of the combustion chamber 8—as already mentioned—the outlet port 24 is located, and in the upper zone 30 the flame tube 14 as a connecting element with the burner 10 as well as an outlet port 36 of a forechamber 38.

The forechamber 38 consists circular cross-sections 42 arranged along the central axis 40 thereof and may be mentally divided into at least two sections, namely a cylindrical upper section 44 and a conically tapering bottom section 46 opening directly into the combustion chamber 8.

A charging conduit 48 opens into the forechamber 38, extending eccentrically and perpendicularly with respect to the cylindrical section 44, such that a linear injector flow 50 flowing through the charging conduit 48 may be supplied eccentrically into the forechamber 38. It flows along the inner forechamber wall 52 and is deflected by the curved form thereof whereby a rotating transport flow 54 is generated which exits through the outlet port 36 from the forechamber 38 and flows into the upper zone 30 of the combustion chamber 8.

An admixer 56 is connected to the free end of the charging conduit 48 and is made up of an injector 58 comprising an injector nozzle 60, a starting material supply conduit 62 e.g. consisting of a starting material chute, and an inlet port 64 opening into the charging conduit 48. The end of the starting material supply conduit 62 opens between the outlet port of the injector nozzle 60 and the inlet port 64 of the charging conduit 48. By means of the injector 58, transport air 66 supplied to it is accelerated to a linear injector flow 50 by means of the injector nozzle 60. Into this linear injector flow 50, comminuted recycled silicate starting materials 70 are introduced. The accelerated linear injector flow 50 is thus made up of transport air 66 and recycled starting material 70. The rotating transport flow 54 generated from the linear injector flow 50 by means of the forechamber 38 flows in the direction of its helix axis 72, which ideally coincides with the central axis 40 of the forechamber 38, through the outlet port 36 from the forechamber 38 into the combustion chamber 8 and through the latter toward the outlet port 24. In the course of its passage, the rotating transport flow 54 gradually diverges inside the combustion chamber 8 of the melting cyclone 1.

A rotating envelope flow 74 comprising helical flow filaments is formed by a flame 76 of the burner 10 inside the combustion chamber 8 along the inner combustion chamber wall 78 and flows from the burner 10 through the burner connection 12 and the flame tube 14 eccentrically in a plane parallel with the circular cross-sections 26 of the combustion chamber 8 into the upper zone 30 of the combustion chamber 8 and from there descends in helical trajectories to the outlet port 24 of the combustion chamber 8. Herein the envelope flow 74 encompasses the transport flow 54 which gradually diverges on its way from outlet port 36 to outlet port 24, resulting in continuous mixing of the transport flow 54 with the envelope flow 74.

Together with the flame 76 of burner 10, the exhaust gas 80 thereof also flows into the combustion chamber 8. In the upper zone 30 of the combustion chamber 8 impurities and waste substances, respectively, adhering to the starting material 70 are burnt up. The combustion products enter into the gaseous phase and mix with the exhaust gas 80 which ultimately flows through the outlet port 24 into the feeder 2. In the central zone 32 and bottom zone 34 of the combustion chamber 8 the recycled silicate starting material 70 is melted to become a molten starting material 82 which also flows together with the exhaust gas 80 through the outlet port 24 into the feeder 2 and through the latter into a melt tub (not shown). The exhaust gas 80 is disposed of together with the exhaust gases from the melting tub.

The combustion chamber wall 78 as well as a burner orifice 84 are lined with extremely heat-resistant and inert bricks 86. The combustion chamber 8 moreover includes a cooling means 88 for cooling the combustion chamber wall 78 and the burner orifice 84. The forechamber 38 also includes a cooling means 94 whereby the forechamber wall 52 may be cooled by means of a cooling medium.

Figure 2:
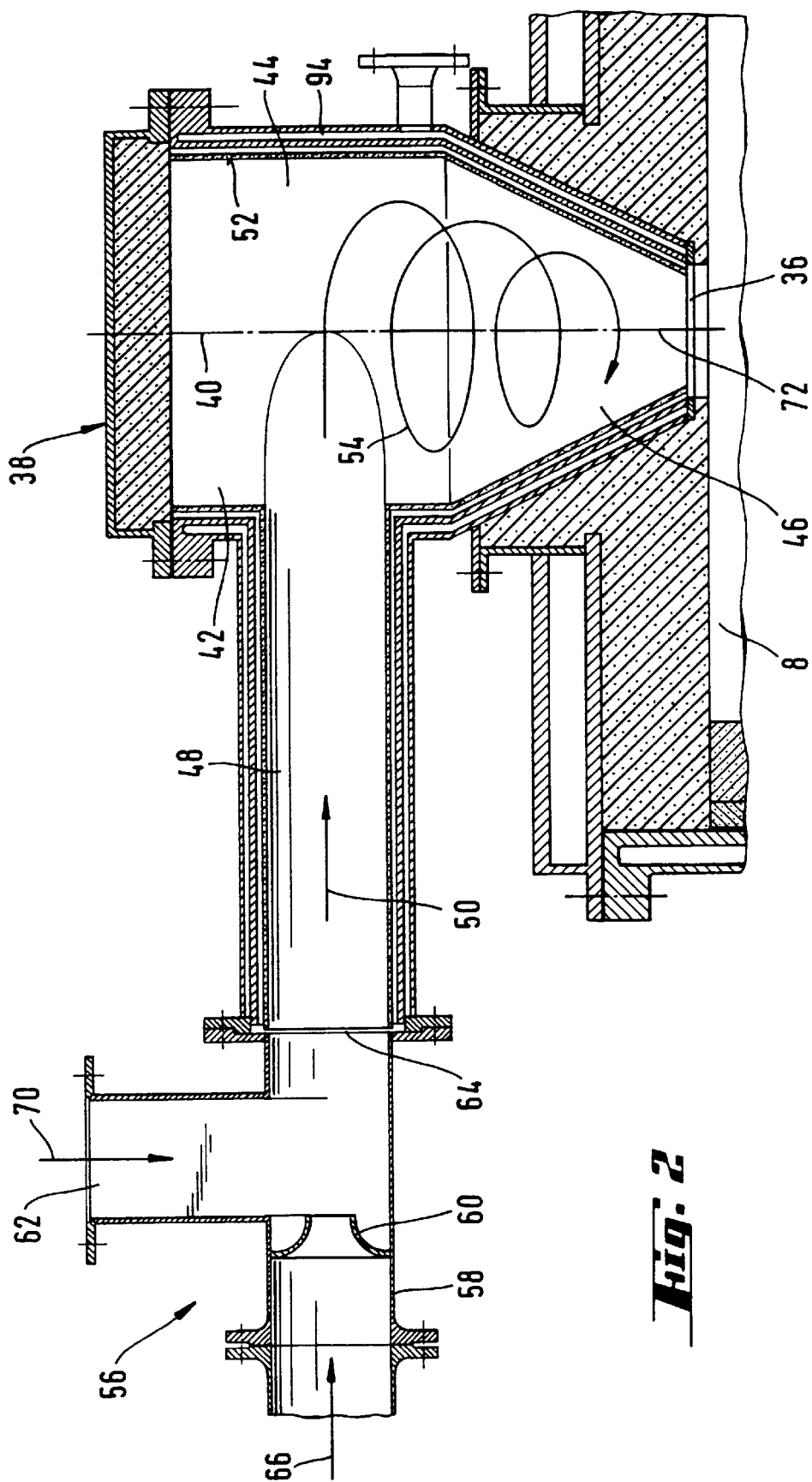
FIG. 2 shows an enlarged sectional view of the admixer represented in FIG. 1 and the forechamber.
Figure 3:
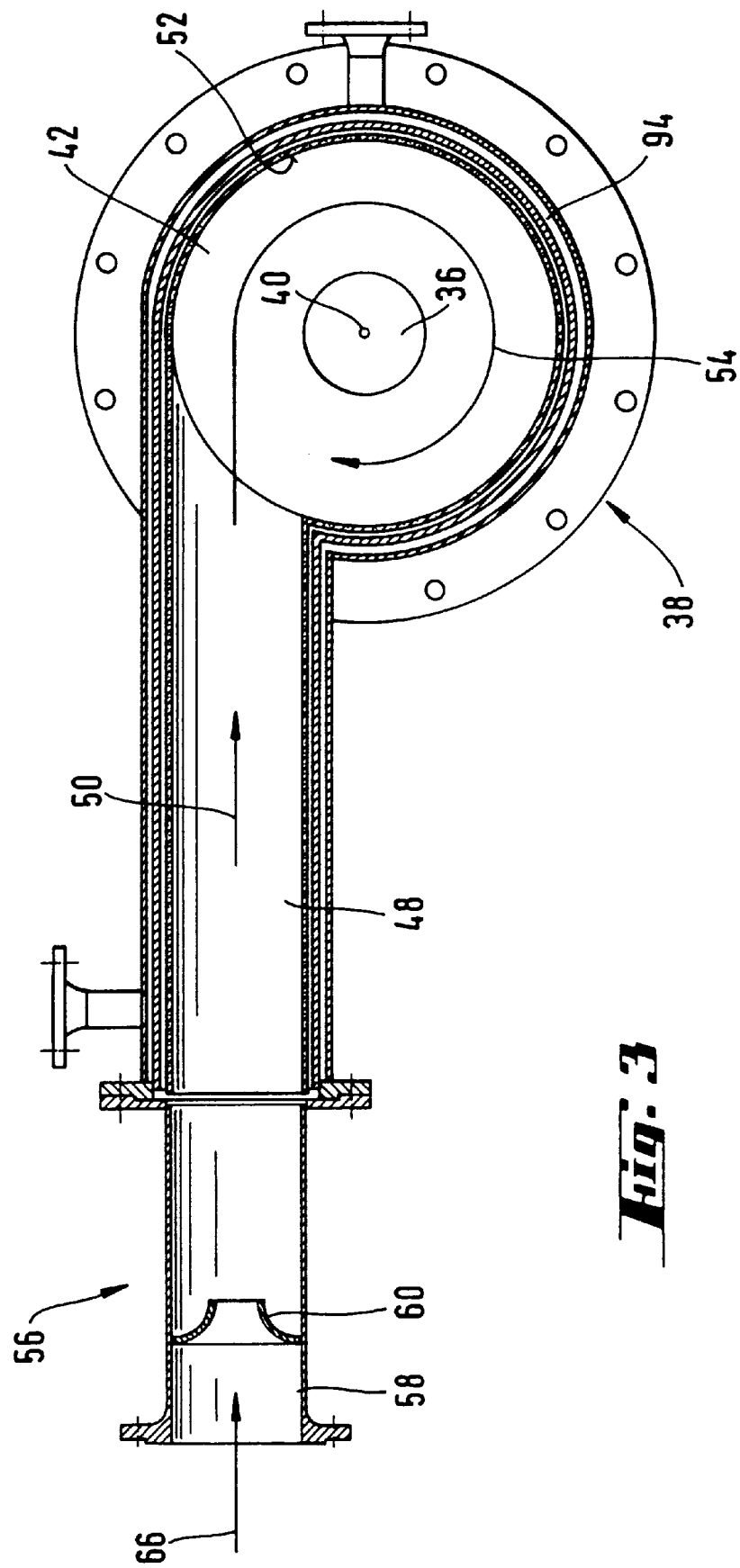
FIG. 3 shows a sectional view of admixer and forechamber which corresponds to the representation of FIG. 2.

An enlarged view of the forechamber 38 and of the admixer 56 is shown in FIG. 2, and a cross-sectional view thereof is shown in FIG. 3. The transport air 66 already pre-accelerated or pre-compressed, respectively, is supplied to the injector 58 and relaxed by the injector nozzle 60 to thereby experience considerable subsequent acceleration. In this manner, flow velocities as high as in excess of 250 m/s are obtainable. The transport air 66 thus accelerated is supplied with recycled silicate starting material 70 through the starting material supply conduit 62, resulting in a linear injector flow 50 made up of transport air 66 and starting material 70.

The linear injector flow 50 is supplied through the charging conduit 48 to the forechamber 38 wherein the injector flow 50 is transformed into a rotating transport flow 54 comprising helical flow filaments. This rotating transport flow 54 flows along its helix axis 72 from the cylindrical upper portion 44 of the forechamber through the bottom portion 46 conically tapering in flow direction, exits from the forechamber 38 through the outlet port 36 and enters the combustion chamber 8 (not shown). The conical taper of the bottom portion 46 has the twofold purpose of once more centering the rotating transport flow 54 and at the same time accelerating it to some extent, and on the other hand of preventing thermal feedback from the combustion chamber 8 (not shown) into the forechamber 38. In order to reduce the heat load and prevent starting material particles from adhering to the forechamber wall 52, the forechamber 38 is equipped with a cooling means 94.

We claim:

1. Method for melting silicate waste material to recycle it wherein heat for melting the silicate waste material is generated while supplying fuel and combustion air into a combustion chamber,
    whereby a forechamber is provided to create a rotating transport flow following helical flow patterns consisting of transport air and silicate waste material, and
    whereby said rotating transport flow consisting of transport air and silicate waste material is supplied in the direction of a helix axis of said rotating transport flow into said combustion chamber.

2. Method according to claim 1, whereby said transport flow is supplied coaxially with a longitudinal axis of said combustion chamber into an upper zone of said combustion chamber.

3. Method according to claim 1 or 2, whereby said transport air is accelerated and said silicate waste material is introduced into an accelerated transport air flow to generate a linear injector flow made up of transport air and silicate waste material, and whereby the linear injector flow thus generated is made to rotate to form the transport flow.

4. Method according to claim 1, whereby the supplied transport flow is encompassed by a rotating envelope flow following helical flow patterns provided by a flame of a burner, in the upper zone of said combustion chamber.

5. Method according to claim 4, whereby said transport flow made up of silicate waste material and transport air, and said rotating envelope flow mix with each other while descending inside said combustion chamber in the direction of the longitudinal axis thereof.

6. Method according to claim 5, whereby said transport flow and said rotating envelope flow rotate in the same direction inside said combustion chamber, their rotational vectors having the same orientation.

7. Method according to claim 1, whereby a first dwelling time of said silicate waste material and an elevated temperature in the upper zone of said combustion chamber are selected such that oxidizable substances adhering to said silicate waste material or contained in said silicate waste material burn up and the combustion products enter the gaseous phase and mix with the exhaust gas of the flame, and that a second dwelling time of said silicate waste material and a lower temperature in the central zone of said combustion chamber are selected such that said silicate waste material enters into the liquid phase and exits from said combustion chamber as pure molten starting material together with said exhaust gas.

8. Method according to claim 1, whereby fresh air is heated with heat energy from at least one of a melting tub exhaust gas or said exhaust gas, and the fresh air thus heated is divided into a partial flow of said combustion air directly supplied into said combustion chamber and a partial flow having the form of said transport air.

9. Device for the use in melting silicate waste material to recycle it, comprising means for introducing fuel and combustion air into a combustion chamber for burning up said fuel and combustion air in the presence of said silicate waste material, wherein a forechamber, comprising circular cross-sections along a central axis thereof, is arranged between said combustion chamber and an admixer for generating in a charging conduit connecting the admixer with the forechamber and opening into the forechamber an injector flow made up of silicate waste material and transport air, for supplying said injector flow eccentrically to said forechamber in a crosswise direction with respect to the central axis thereof through said charging conduit for generating a transport flow, and that said forechamber comprises an outlet port arranged crosswise with respect to the central axis and at an axial distance from said charging conduit, which opens into said combustion chamber.

10. Device according to claim 9, wherein said admixer is made up of an injector comprising an injector nozzle, a silicate waste material supply conduit, and an inlet port into the charging conduit, said silicate waste material supply entering between said injector nozzle and said inlet port.

11. Device according to claim 9 or 10, wherein a burner for combustion of said fuel and of said combustion air is provided externally of said combustion chamber, said combustion chamber having an upright longitudinal axis, said burner with a burner orifice thereof being disposed in a plane parallel with the longitudinal axis of said combustion chamber eccentrically in an upper zone thereof, such that a generated flame having the form of an envelope flow can be channelled eccentrically into said combustion chamber.

12. Device according to claim 9, wherein a portion of said forechamber disposed at an upstream position relative to said outlet port of said forechamber has a conically tapering configuration in flow direction and preferably opens directly into said combustion chamber.

13. Device according to claim 9, wherein said forechamber includes a cooling means for cooling a forechamber wall.

14. Device according to claim 9, wherein said combustion chamber comprises an outlet port for a molten starting material and an exhaust gas, which is positioned crosswise with respect to the longitudinal axis in the bottom zone of said combustion chamber.

15. Device according to claim 10, wherein said silicate waste material supply conduit is a silicate waste material chute.

16. A method for melting silicate waste material for recycling, comprising:
   generating heat for melting the silicate waste material while supplying fuel and combustion air into a combustion chamber;
   creating a rotating transport flow in a forechamber, the rotating transport flow following helical flow patterns consisting of transport air and silicate waste material, and
   supplying the rotating transport flow made of transport air and silicate waste material into the combustion chamber in the direction of a helix axis of the rotating transport flow.

17. The method according to claim 16, further comprising:
   supplying the transport flow coaxially with a longitudinal axis of the combustion chamber into an upper zone of the combustion chamber.

18. The method according to claim 16 or 17, further comprising:
   accelerating the transport air; and
   introducing the silicate waste material therein to generate a linear injector flow made up of the transport sir and the silicate waste material,
   whereby the linear injector flow thus generated is made to rotate to form the transport flow.

19. The method according to claim 16, wherein the transport flow is encompassed by a rotating envelope flow that follows helical flow patterns from a flame of a burner positioned in an upper zone of said combustion chamber.

20. The method according to claim 19, wherein the transport flow and the rotating envelope flow mix with each other while descending longitudinally inside the combustion chamber.

21. The method according to claim 20, wherein the transport flow and the rotating envelope flow rotate with rotational vectors having the same orientation.

22. The method according to claim 16, further comprising:
   selecting both a first dwelling time of the silicate waste material and an elevated temperature in an upper zone of the combustion chamber such that oxidizable substances associated with the silicate waste material burn to produce combustion products that enter a gaseous phase and mix with an exhaust gas of the flame; and
   selecting both a second dwelling time of the silicate waste material and a lower temperature in a central zone of the combustion chamber such that the silicate waste material enters into a liquid phase so that it exits from said combustion chamber as pure molten starting material together with the exhaust gas.

23. Method according to claim 16, further comprising:
   heating fresh air by one of either an exhaust gas or a melting tub exhaust gas; and
   dividing the fresh air, once heated, into a partial flow of the combustion air directly supplied into the combustion chamber and a partial flow of the transport air.

24. A device for the use in melting silicate waste material to recycle it, comprising:
   a feeder for fuel and combustion air;
   a combustion chamber connected to the feeder into which fuel and combustion air are introduced from the feeder to burn the fuel and combustion air in the presence of the silicate waste material;
   a forechamber, comprising circular cross-sections along a central axis thereof, connected to the combustion chamber;
   an admixer connected by a charging conduit to the forechamber,
   wherein the admixer generates an injector flow in the charging conduit made up of silicate waste material and transport air, and
   wherein the admixer supplies the injector flow eccentrically to the forechamber in a crosswise direction with respect to the central axis thereof through the charging conduit to generate a transport flow that follows helical flow patterns; and
   an outlet port in the forechamber, arranged crosswise with respect to the central axis and at an axial distance from the charging conduit, opening into the combustion chamber.

25. The device according to claim 24, wherein said admixer comprises:
   an injector comprising an injector nozzle and a silicate waste material supply conduit; and
   an inlet port from the injector into the charging conduit,
   wherein the silicate waste material supply enters between the injector nozzle and the inlet port.

26. The device according to claim 24 or 25, further comprising:
   a burner, external to the combustion chamber, for combustion of the fuel and the combustion air,
   wherein the combustion chamber has an upright longitudinal axis and the burner includes a burner orifice disposed in a plane parallel with the longitudinal axis and eccentrically with respect thereto so that a generated flame, having the form of an envelope flow, is channeled eccentrically into the combustion chamber.

27. The device according to claim 24, wherein a portion of the forechamber conically tapers toward the outlet port and opens directly into the combustion chamber.

28. The device according to claim 24, further comprising:
   a cooling jacket around at least a portion of the forechamber to cool at least one wall of the forechamber.

29. The device according to claim 24, wherein the combustion chamber comprises an outlet port positioned crosswise with respect to the longitudinal axis of the combustion chamber in a bottom zone thereof.

30. The device according to claim 25, wherein said silicate waste material supply conduit is a silicate waste material chute.

* * * * *

UNITED STATES PATENT AND TRADEMARK OFFICE
CERTIFICATE OF CORRECTION

PATENT NO. : 6,047,566  
DATED : April 11, 2000  
INVENTOR(S) : Fleckenstein et al.

Page 1 of 1

It is certified that error appears in the above-identified patent and that said Letters Patent is hereby corrected as shown below:

<u>Title page,</u>
Item [87], please change "PCT Pub. Date: Oct. 3, 1990" to
-- PCT Pub. Date: Oct. 3, 1996 --

Signed and Sealed this

Twenty-second Day of January, 2002

Attest:

Attesting Officer

JAMES E. ROGAN
*Director of the United States Patent and Trademark Office*